(12) United States Patent
Yamamoto

(10) Patent No.: US 12,076,853 B2
(45) Date of Patent: Sep. 3, 2024

(54) ROBOT

(71) Applicant: FANUC CORPORATION, Yamanashi (JP)

(72) Inventor: Hiroaki Yamamoto, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 18/042,420

(22) PCT Filed: Sep. 22, 2021

(86) PCT No.: PCT/JP2021/034769
§ 371 (c)(1),
(2) Date: Feb. 21, 2023

(87) PCT Pub. No.: WO2022/071057
PCT Pub. Date: Apr. 7, 2022

(65) Prior Publication Data
US 2023/0356419 A1 Nov. 9, 2023

(30) Foreign Application Priority Data
Sep. 29, 2020 (JP) ................ 2020-163503

(51) Int. Cl.
*B25J 19/00* (2006.01)
*F16H 57/04* (2010.01)

(52) U.S. Cl.
CPC ....... *B25J 19/0062* (2013.01); *F16H 57/0405* (2013.01)

(58) Field of Classification Search
CPC ............ B25J 19/0062; F16H 57/0405
See application file for complete search history.

(56) References Cited

U.S. PATENT DOCUMENTS

2012/0153652 A1* 6/2012 Yamaguchi .......... B25J 15/0028
901/39
2019/0054614 A1* 2/2019 Ohtsubo .............. B25J 19/0062

FOREIGN PATENT DOCUMENTS

| JP | 2005-177914 A | 7/2005 |
| JP | 2007-232003 A | 9/2007 |
| JP | 2009-226488 A | 10/2009 |
| JP | 2015-161234 A | 9/2015 |
| JP | 2019-034383 A | 3/2019 |
| JP | 2019-183914 A | 10/2019 |
| JP | 2020-041562 A | 3/2020 |

OTHER PUBLICATIONS

International Search Report issued in PCT/JP2021/034769; mailed Nov. 16, 2021.

* cited by examiner

*Primary Examiner* — William C Joyce
(74) *Attorney, Agent, or Firm* — Studebaker & Brackett PC

(57) ABSTRACT

A lubricant container part 7 is provided to a robot arm drive unit 5 pertaining to a first arm 2, 2a and a second arm 3, 3a which displace relative to each other via a reduction mechanism 4, and a receiving member 9, 9a having a recess 10 forming a concave shape facing vertically upward is provided below the liquid level 8 of a lubricant 6 inside the lubricant container part 7, and through this configuration, even when time elapses after stopping of the robot, the lubricant can be extracted from the receiving member 9, 9a in a manner suitable for observing the state of iron powder included in the lubricant 6.

3 Claims, 5 Drawing Sheets

ROBOT

TECHNICAL FIELD

The present invention relates to a robot such as an industrial robot.

BACKGROUND ART

Lubricants such as grease or oil are used in speed reduction mechanisms in robot joints. It is known that the degree of wear and tear on a speed reduction mechanism correlates with how iron particles are contained in the lubricant therein and properties of the iron particles. For this reason, the state of wear and tear on the speed reduction mechanism including internal damage is diagnosed based on how iron particles are contained in the lubricant and properties of the iron particles. To observe the size and the concentration of iron particles contained in the lubricant for the purpose of such diagnosis, a certain amount of the lubricant is withdrawn. Various proposals have been made to address issues of lubricants for use in speed reduction mechanisms. For example, a technique that has been proposed prevents a lubricant from leaking out even if the lubricant thermally expands in a lubrication chamber or the lubrication chamber is deformed due to contact or collision with another object (see, for example, Patent Document 1). Another technique that has been proposed increases the utilization rate of a robot by extending the cycle for replacing a lubricant in a speed reduction mechanism (see, for example, Patent Document 2). Another technique that has been proposed adjusts the amount of a lubricant that drips onto an oil receiving member by utilizing the temperature dependence of the viscosity of the lubricant. If the temperature of the lubricant gets higher and the viscosity thereof gets lower, the lubricant is caused to take a detour from the oil receiving member to flow through a long oil flow path. Thus, cooling is promoted and the temperature of the lubricant is maintained within a predetermined range (see, for example, Patent Document 3).

PRIOR ART REFERENCE

Patent Document

Patent Document 1: Japanese Unexamined Patent Application, Publication No. 2019-34383
Patent Document 2: Japanese Unexamined Patent Application, Publication No. 2020-41562
Patent Document 3: Japanese Unexamined Patent Application, Publication No. 2015-161234

DISCLOSURE OF THE INVENTION

Problems to be Solved by the Invention

Incidentally, in order to observe how iron particles or the like are contained in the lubricant and properties of the iron particles or the like for the purpose of diagnosing the state of wear and tear on the speed reduction mechanism, it is desirable to collect the lubricant when the concentration distribution of the iron particles or the like in the lubrication chamber is uniform. While the robot is in operation, the iron particles in the lubricant are agitated due to rotation and oscillation of elements of the speed reduction mechanism such as gears and a reducer, and the concentration distribution thereof tends to be relatively uniform. However, when the lubricant is collected, it is generally necessary to stop the robot in order for an operator to approach the robot. While the robot is being stopped, the iron particles settle out by gravity inside the lubrication chamber. If the lubricant is collected from the lubrication chamber some time after the robot has stopped, it is impossible to determine exactly how the iron particles are distributed in the lubricant. In particular, in a case where the lubricant is a low-viscosity lubricant such as oil, iron particles therein settle out at a higher rate than in a case where the lubricant is a high-viscosity lubricant such as grease, and the time available for collection so that the collected sample is suitable for the observation is limited. Since the iron particles settle to a lower part of the lubrication chamber, general lubricant collection does not work, in which the lubricant is collected from the liquid surface of the lubricant in the lubrication chamber, and it is difficult to collect the lubricant from where the iron particles have settled.

It is therefore desired to make it possible to collect the lubricant in a manner suitable for observing the state of iron particles contained in the lubricant even some time after the robot has stopped.

Means for Solving the Problems

A robot according to an aspect of the present disclosure includes: a robot arm drive unit including a first arm, a second arm, and a speed reduction mechanism held between the first arm and the second arm, the robot arm drive unit being adapted for relative movement of the first arm and the second arm through the speed reduction mechanism; a lubricant container provided in the robot arm drive unit and configured to contain a lubricant; and a receiving member provided below a liquid surface of the lubricant in the lubricant container, the receiving member including a recessed section having a vertically upward recess shape.

Effects of the Invention

According to the foregoing aspect, it is possible to collect the lubricant from the receiving member in a manner suitable for observing how iron particles are distributed in the lubricant even some time after the robot has stopped.

PREFERRED MODE FOR CARRYING OUT THE INVENTION

Figure 1:
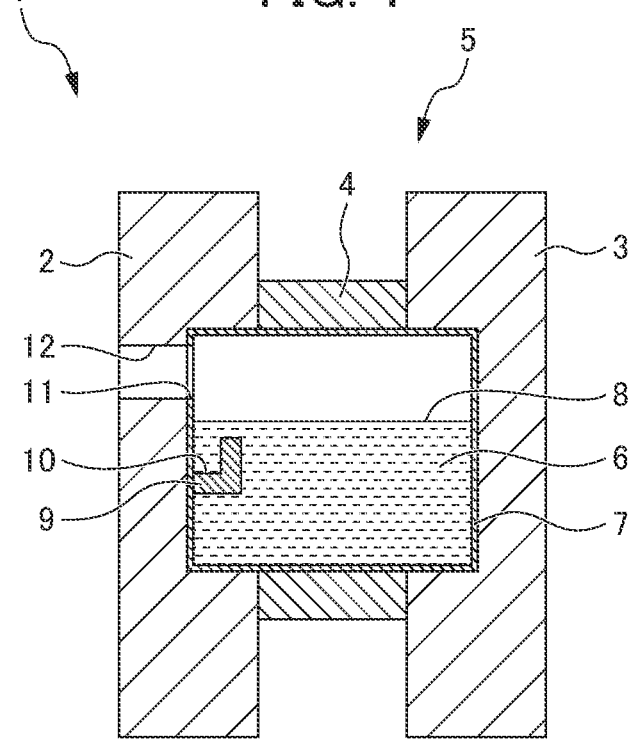
FIG. 1 is a cross-sectional view of a speed reduction mechanism and a lubricant container in a robot according to the present disclosure.

FIG. 1 is a cross-sectional view of a speed reduction mechanism and a lubricant container in a robot according to the present disclosure. FIG. 1 illustrates elements of a robot 1 that form a robot arm drive unit 5 adapted for relative movement of a first arm 2 and a second arm 3 through a speed reduction mechanism 4 held between the first arm 2 and the second arm 3. The speed reduction mechanism 4 has a cylindrical lubricant container 7 filled with a lubricant 6 to a predetermined liquid level. A receiving member 9 for receiving and collecting iron particles distributed in the lubricant 6 is provided below a liquid surface 8 of the lubricant 6 in the lubricant container 7. The receiving member 9 includes a recessed section 10 having a vertically upward recess shape. It should be noted that the relative position between the first arm 2 and the lubricant container 7 does not change even when the first arm 2 and the second arm 3 are in relative movement.

Figure 2:
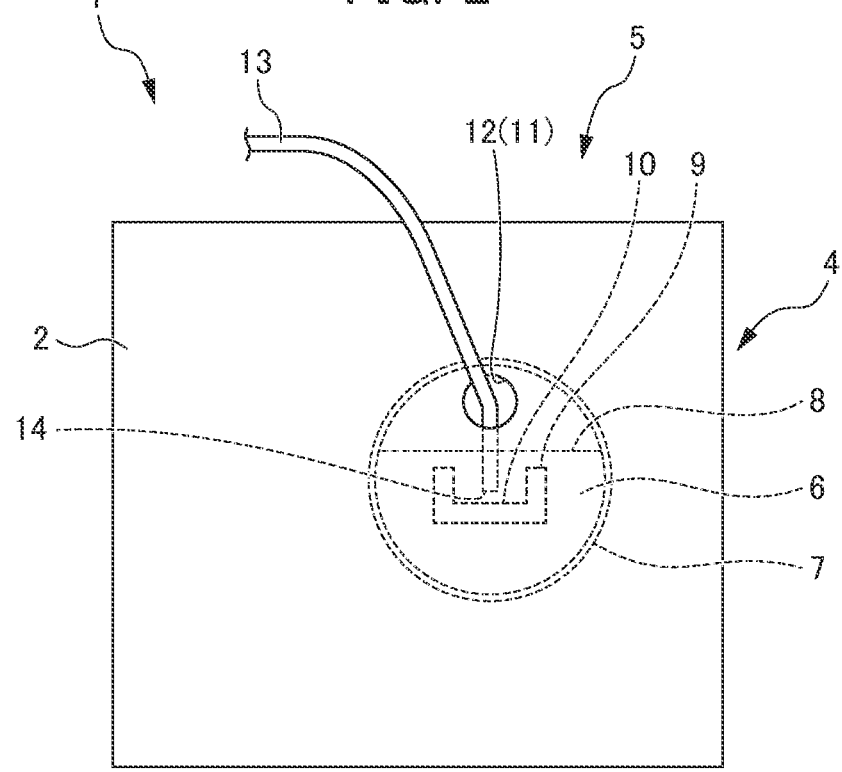
FIG. 2 is a diagram illustrating collection of iron particles accumulated in a receiving member from the lubricant container of the robot viewed from a side toward one arm shown in FIG. 1.
Figure 3:
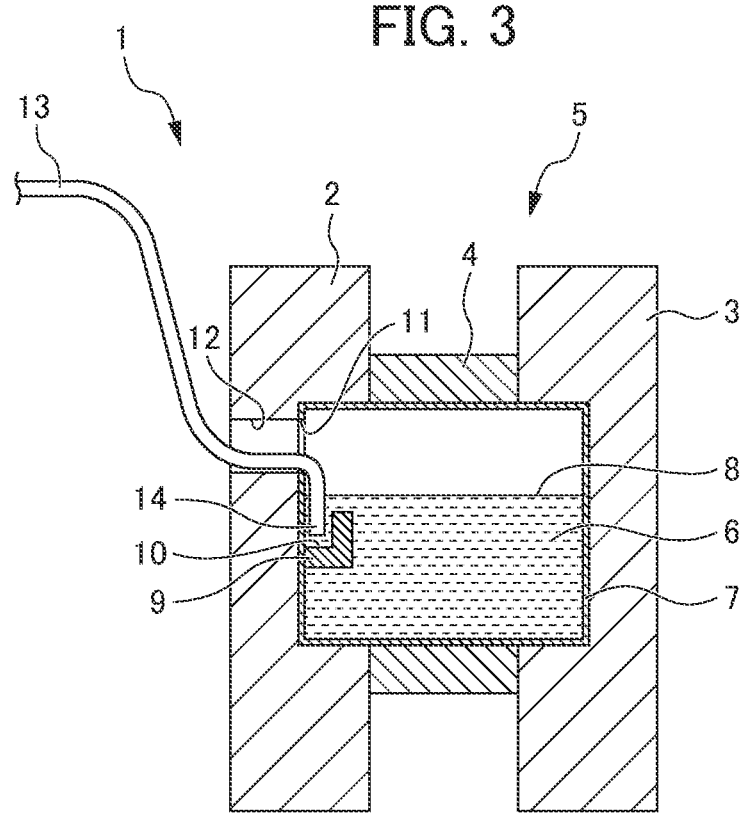
FIG. 3 is a diagram illustrating the collection of the iron particles accumulated in the receiving member from the lubricant container of the robot viewed from the same viewpoint as in FIG. 1.

Iron particles are produced as elements of the speed reduction mechanism 4 such as gears and a reducer (not shown) wear due to friction. The iron particles float in the lubricant 6 and are agitated due to the motion of the elements of the speed reduction mechanism 4 while the robot 1 is in operation. As a result, the concentration of the iron particles in the lubricant 6 shows a near homogeneous distribution. While the iron particles are agitated, a portion of the iron particles that have reached a location above the recessed section 10 of the receiving member 9 gradually accumulate in the receiving member 9 (recessed section 10 thereof). Once the robot 1 has stopped, the iron particles are not dispersed and settle out by gravity within the lubricant container 7. Referring to FIGS. 2 and 3 as well as FIG. 1, the following describes a configuration for collecting iron particles accumulated in the recessed section 10 of the receiving member 9.

FIGS. 2 and 3 are diagrams illustrating collection of iron particles accumulated in the receiving member 9 from the lubricant container 7 of the robot 1. FIG. 2 is a side view of the speed reduction mechanism 4 of the robot 1 and an area therearound viewed from the first arm 2 side. FIG. 3 is a diagram showing the elements viewed from the same viewpoint as in FIG. 1. In FIGS. 2 and 3, elements corresponding to those shown in FIG. 1 are labelled using the same reference numerals as in FIG. 1. The lubricant container 7 has a collection port 11 for collecting iron particles accumulated in the recessed section 10 of the receiving member 9. In this configuration, the collection port 11 also serves as a feed and discharge port for feeding or discharging the lubricant 6 to or from the lubricant container 7. The collection port 11 is located above the liquid surface 8 of the lubricant 6. In the side view in FIG. 2, the receiving member 9 is located vertically below the collection port 11, which serves as the feed and discharge port. In the present embodiment, the center of the recessed section 10 of the receiving member 9 in a left-right direction in the side view in FIG. 2 is located vertically below the center of the collection port 11, which serves as the feed and discharge port. The first arm 2 has a communication hole 12 extending from the outside to the collection port 11 in the lubricant container 7.

To collect iron particles accumulated in the receiving member 9, an iron particle collection tube 13 is inserted, through the communication hole 12 in the first arm 2, from the collection port 11 in the lubricant container 7 toward the receiving member 9 located vertically below the collection port 11. Since the receiving member 9 is located vertically below the collection port 11 in the lubricant container 7, a tip 14 of the tube 13 inserted therein can be easily brought close to the bottom of the recessed section 10 of the receiving member 9. With the tip 14 of the tube 13 in the recessed section 10, the iron particles accumulated in the recessed section 10 of the receiving member 9 is collected together with the lubricant 6 using a suctioning device such as a sample collection syringe. The degree of wear and tear on the speed reduction mechanism 4 of the robot 1 can be estimated by analyzing concentration distribution, size, and other properties of the iron particles collected together with the lubricant 6 as described above.

Figure 4:
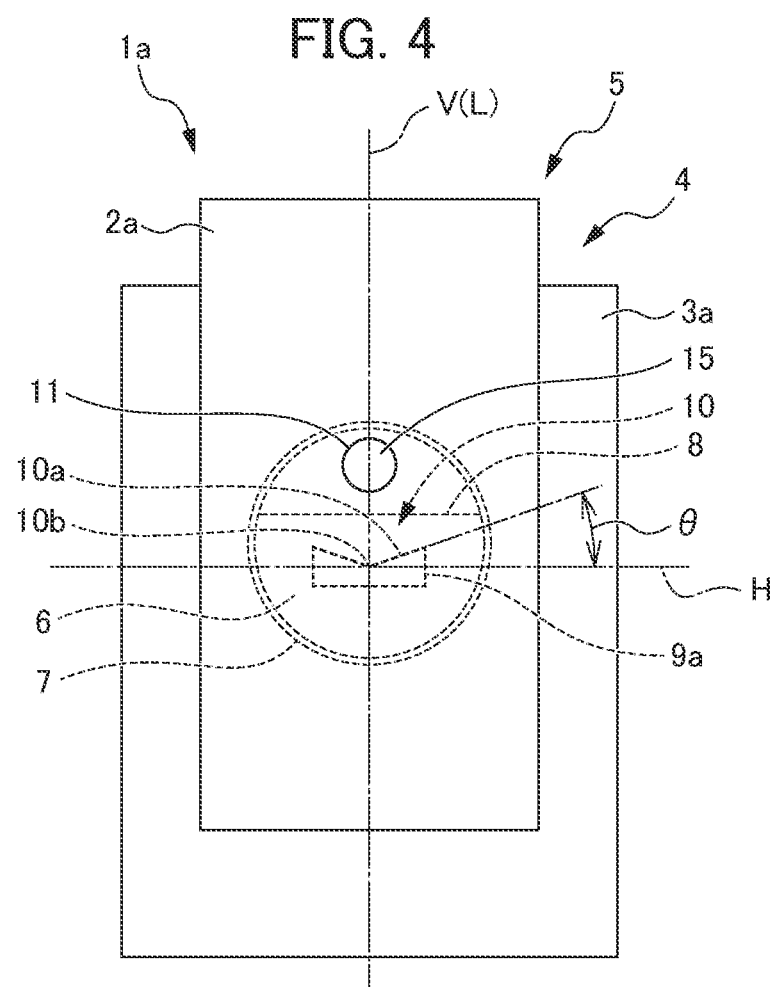
FIG. 4 is a diagram showing the relationship between the pose of one arm and a recessed section of a receiving member in a robot according to a different aspect of the present disclosure.
Figure 5:
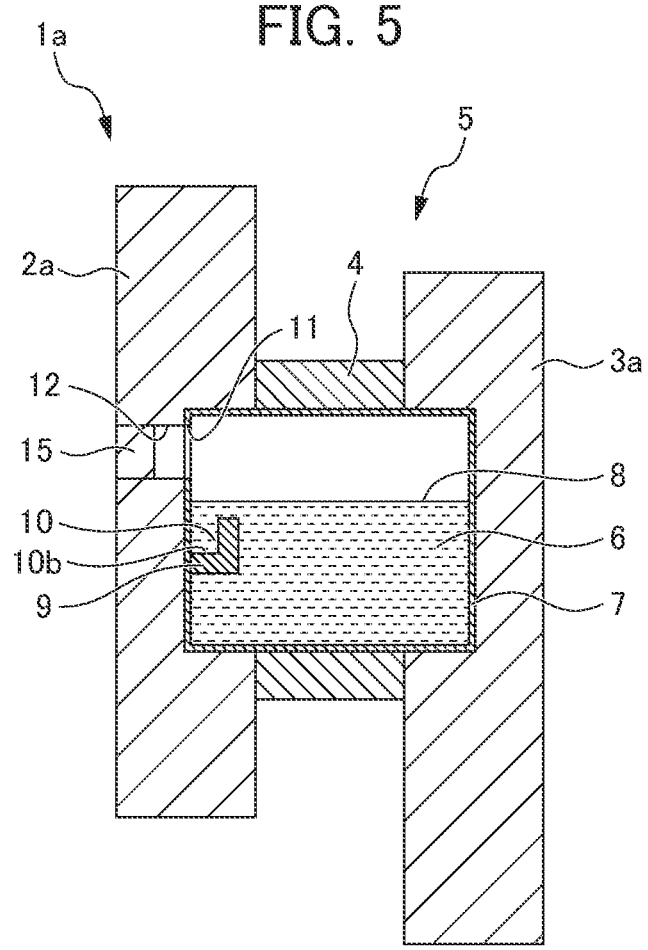
FIG. 5 is a sectional side view of the state shown in FIG. 4.
Figure 6:
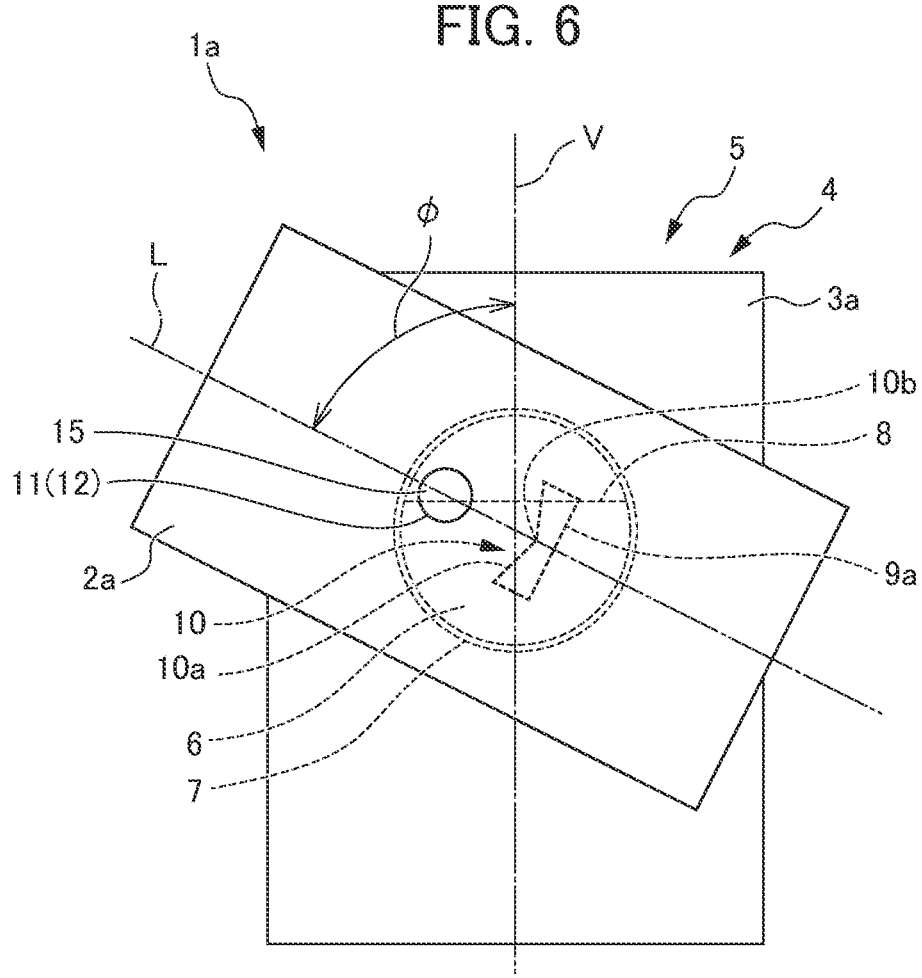
FIG. 6 is a diagram showing the robot in FIG. 4 with the one arm having swung.

FIGS. 4 to 6 are diagrams illustrating a different aspect of the present disclosure. A robot 1a shown in FIGS. 4 to 6 has a first arm 2a and a second arm 3a corresponding to the first arm 2 and the second arm 3 of the robot 1 shown in FIGS. 1 to 3. According to the aspect disclosed in FIGS. 4 to 6, a lubricant container 7 swings in unison with the first arm 2a. FIG. 4 is a diagram showing the relationship between the pose of the first arm 2a and a recessed section 10 of a receiving member 9a in the robot 1a according to the different aspect of the present disclosure viewed from the first arm 2a side. FIG. 5 is a sectional side view of the state shown in FIG. 4. FIG. 6 is a diagram showing the first arm 2a in FIG. 4 that has swung. In FIGS. 4 to 6, elements corresponding to those shown in FIGS. 1 to 3 are labelled using the same reference numerals as in FIGS. 1 to 3. It should be noted that the robot 1a in the states shown in FIGS. 4 to 6 has a cap 15 fitting in a communication hole 12 leading to a collection port 11.

FIGS. 4 and 5 show the first arm 2a in a pose in which a longitudinal central axis L of the first arm 2a coincides with a vertical virtual axis V. In a side cross-sectional view, the recessed section 10 of the receiving member 9a in the cylindrical lubricant container 7 of the robot 1a has inclined surfaces 10a symmetrically sloping upward in the form of a V-shaped valley from a central valley bottom 10b. When the first arm 2a is in the pose shown in FIG. 4, the valley bottom 10b of the recessed section 10 viewed from a direction perpendicular to the plane of FIG. 4 coincides with the central axis L (and thus the virtual axis V) mentioned above. The two inclined surfaces 10a of the recessed section 10 each slope upward at an inclination angle θ relative to a horizontal plane H tangent to the valley bottom 10b and are symmetrical to each other with respect to the central axis L.

When the first arm 2a is in the pose shown in FIGS. 4 and 5 described above, the entirety of the recessed section 10 of the receiving member 9a is located below the liquid surface 8 of the lubricant 6. When the first arm 2a in the pose shown in FIGS. 4 and 5 described above swings within a rotation angle range corresponding to the inclination angle θ described above, the inclined surfaces 10a of the recessed section 10 do not move downward beyond the horizontal plane H. In this case, iron particles passingly captured in the recessed section 10 of the receiving member 9a is substantially prevented from spilling out of the recessed section 10.

FIG. 6 illustrates the first arm 2a that has swung through a maximum swing angle Φ. Note here that the maximum swing angle Φ is the maximum value of swing angle, which is an angle between the longitudinal central axis L of the first arm 2a and the vertical virtual axis V. As long as the robot 1a is in normal operation, the first arm 2a repeatedly swings through an angle that reaches the maximum swing angle (shown in FIG. 6. The maximum swing angle Φ is greater than the inclination angle θ at the two inclined surfaces 10a of the recessed section 10 described above. That is, the inclination angle θ is smaller than the maximum swing angle Φ. The maximum swing angle Φ is, for example, approximately 100 degrees.

The relationship between the inclination angle θ and the maximum swing angle Φ described above can be summarized as follows. That is, the recessed section 10 has the inclined surfaces 10a symmetrically sloping upward in the form of a V-shaped valley from the central valley bottom 10b, and the inclination angle θ formed by the inclined surfaces 10a with the horizontal plane H when the first arm 2a is at a swing angle of 0, that is, when the longitudinal direction (longitudinal central axis L) of the first arm 2a aligns with the vertical direction (coincides with the vertical virtual axis V) is smaller than the maximum swing angle Φ that is reached when the first arm 2a swings.

When the first arm 2a swings through the maximum swing angle Φ, one of the inclined surfaces 10a of the recessed section 10 moves downward beyond the horizontal plane H (FIG. 4). Consequently, iron particles passingly captured in the recessed section 10 of the receiving member 9a spill out of the recessed section 10 and fall down due to their own weight. While the first arm 2a is repeatedly swinging through an angle that reaches the maximum swing angle Φ, iron particles passingly captured in the recessed section 10 of the receiving member 9a spill out of the recessed section 10 and fall down each time the first arm 2a swings. As long as the robot 1a is in operation, therefore, iron particles in the lubricant 6 do not stay in the recessed section 10 of the receiving member 9a. The robot 1a is stopped to collect iron particles accumulated in the recessed section 10 of the receiving member 9a in the same manner as shown in FIGS. 2 and 3. Thus, because of the above-described configuration, iron particles kept distributed in the lubricant 6 until just before the collection are collected. As such, the iron particles faithfully reflect the degree of wear and tear on the speed reduction mechanism 4 at the time of the collection. The degree of wear and tear on the speed reduction mechanism 4 of the robot 1a can be estimated with high accuracy by analyzing concentration distribution, size, and other properties of such iron particles.

The effects of the robot according to the present disclosure described above with reference to FIGS. 1 to 6 will be summarized below.

(1) A robot 1, 1a according to the present disclosure includes: a robot arm drive unit 5 including a first arm 2, 2a; a second arm 3, 3a, and a speed reduction mechanism 4 held between the first arm 2, 2a and the second arm 3, 3a, the robot arm drive unit 5 being adapted for relative movement of the first arm 2, 2a and the second arm 3, 3a through the speed reduction mechanism 4; a lubricant container 7 provided in the robot arm drive unit 5 and configured to contain a lubricant 6; and a receiving member 9, 9a provided below a liquid surface 8 of the lubricant 6 in the lubricant container 7, the receiving member 9, 9a including a recessed section 10 having a vertically upward recess shape.

According to the robot described in (1), it is possible to keep iron particles from settling to the bottom of the lubricant container 7, and thus to collect iron particles captured in the receiving member 9, 9a together with the lubricant 6 even some time after the robot 1, 1a has stopped. The degree of wear and tear on the speed reduction mechanism 4 of the robot 1, 1a can be estimated by analyzing concentration distribution, size, and other properties of the iron particles collected together with the lubricant 6 as described above.

(2) In the robot 1, 1a according an aspect of the present disclosure, the receiving member 9, 9a is located vertically below a collection port (feed and discharge port) 11 provided above the liquid surface 8 of the lubricant 6 for feeding or discharging the lubricant 6 to or from the lubricant container 7.

In the robot 1, 1a described in (2), the receiving member 9 is located vertically below the collection port 11 in the lubricant container 7, and thus the tip 14 of the iron particle collection tube 13 inserted therein can be easily brought close to the bottom of the recessed section 10 of the receiving member 9. With the tip 14 of the tube 13 in the recessed section 10, iron particles accumulated in the recessed section 10 of the receiving member 9 can be collected together with the lubricant 6 using a suctioning device such as a sample collection syringe.

(3) In the robot 1a according to the present disclosure, the receiving member 9a is provided to correspond to at least one of the first or second arm 2a or 3a, and is configured to swing with the first arm 2a, which is the at least one arm, and iron particles passingly accumulated in the recessed section 10 fall into the lubricant container 7 when the receiving member 9a moves in conjunction with swinging motion of the first arm 2a.

In the robot 1a described in (3), iron particles in the lubricant 6 do not stay in the recessed section 10 of the receiving member 9a as long as the robot 1a is in operation. The robot 1a is stopped to collect iron particles accumulated in the recessed section 10 of the receiving member 9a. Thus, because of the above-described configuration, iron particles kept distributed in the lubricant 6 until just before the collection are collected. As such, the iron particles faithfully reflect the degree of wear and tear on the speed reduction mechanism 4 at the time of the collection. The degree of wear and tear on the speed reduction mechanism 4 of the robot 1a can be estimated with high accuracy by analyzing concentration distribution, size, and other properties of such iron particles.

(4) In the robot 1a according to the present disclosure, the recessed section 10 has inclined surfaces 10a symmetrically sloping upward in a form of a V-shaped valley from a central valley bottom 10b, and an inclination angle θ formed by the inclined surfaces 10a with a horizontal plane H when the first arm 2a is at a swing angle of 0 relative to a vertical direction is smaller than a maximum swing angle Φ of the first arm relative to the vertical direction.

In the robot 1a described in (4), while the first arm 2a is repeatedly swinging through an angle that reaches the maximum swing angle Φ, iron particles passingly captured in the recessed section 10 of the receiving member 9a spill out of the recessed section 10 and fall down each time the first arm 2a swings. As long as the robot 1a is in operation, therefore, iron particles in the lubricant 6 do not stay in the recessed section 10 of the receiving member 9a. The robot 1a is stopped to collect iron particles accumulated in the recessed section 10 of the receiving member 9a. Thus, because of the above-described configuration, iron particles kept distributed in the lubricant 6 until just before the collection is collected. As such, the iron particles faithfully reflect the degree of wear and tear on the speed reduction mechanism 4 at the time of the collection. The degree of wear and tear on the speed reduction mechanism 4 of the robot 1a can be estimated with high accuracy by analyzing concentration distribution, size, and other properties of such iron particles.

It should be noted that the present disclosure is not limited to the embodiment described above, and various modifications and changes can be made to practice the present disclosure. For example, oil, grease, or the like may be used as the lubricant in the embodiment described above. For another example, in the case of a robot having a configuration in which the second arm 3a swings, the receiving member 9a may be configured to swing with the second arm 3a instead of being configured to swing with the first arm 2a as in the case of the robot 1a. For another example, a receiving member having the same configuration as that described above may be provided in a lubricant container in a speed reduction mechanism of a machine other than a robot or any other device that is subject to mechanical friction when in operation. That is, the present disclosure encompasses modifications and improvements to the extent that the object of the present disclosure is achieved.

EXPLANATION OF REFERENCE NUMERALS 1, 1a: Robot
2, 2a: First arm
3, 3a: Second arm
4: Speed reduction mechanism
5: Drive unit
6: Lubricant
7: Lubricant container
8: Liquid surface
9, 9a: Receiving member
10: Recessed section
10a: Inclined surface
10b: Valley bottom
11: Collection port (feed and discharge port)
12: Communication hole
13: Tube
14: Tip
15: Cap

The invention claimed is:

1. A robot comprising:
a robot arm drive unit including a first arm, a second arm, and a speed reduction mechanism held between the first arm and the second arm, the robot arm drive unit being adapted for relative movement of the first arm and the second arm through the speed reduction mechanism;
a lubricant container provided in the robot arm drive unit and configured to contain a lubricant; and
a receiving member provided below a liquid surface of the lubricant in the lubricant container, the receiving member including a recessed section having a vertically upward recess shape; wherein
the receiving member is provided to correspond to at least one of the first or second arm, and is configured to swing with the at least one arm, and
iron particles passingly accumulated in the recessed section fall into the lubricant container when the receiving member moves in conjunction with swinging motion of the at least one arm.

2. The robot according to claim 1, wherein
the receiving member is located vertically below a feed and discharge port provided above the liquid surface for feeding or discharging the lubricant to or from the lubricant container.

3. The robot according to claim 1, wherein
the recessed section has inclined surfaces symmetrically sloping upward in a form of a V-shaped valley from a central valley bottom, and
an inclination angle formed by the inclined surfaces with a horizontal plane when the at least one arm is at a swing angle of 0 relative to a vertical direction is smaller than a maximum swing angle of the at least one arm relative to the vertical direction.

* * * * *